C. F. SAUTTER, DEC'D.
M. T. SAUTTER, ADMINISTRATRIX.
COMBINATION TURN TABLE AND JACK FOR AUTOMOBILES.
APPLICATION FILED JULY 30, 1910.

1,000,199.

Patented Aug. 8, 1911.

Inventor
Charles F. Sautter

UNITED STATES PATENT OFFICE.

CHARLES F. SAUTTER, OF JAMAICA, NEW YORK; MARY TERESA SAUTTER, OF BROOKLYN, NEW YORK, ADMINISTRATRIX OF SAID CHARLES F. SAUTTER, DECEASED.

COMBINATION TURN-TABLE AND JACK FOR AUTOMOBILES.

1,000,199.  Specification of Letters Patent.  Patented Aug. 8, 1911.

Application filed July 30, 1910. Serial No. 574,713.

*To all whom it may concern:*

Be it known that I, CHARLES F. SAUTTER, a citizen of the United States, residing at Jamaica, county of Queens, and State of New York, have invented new and useful Improvements in Combination Turn-Tables and Jacks for Automobiles, of which the following is a specification.

My invention consists of a new and improved device for lifting and turning a vehicle in its own length.

It may be used on a wagon, buggy, etc., but is particularly adaptable and designed for lifting automobiles and turning them around in their own length. This is very desirable in a crowded garage.

The device consists essentially of a combination turn table and jack, the turn table having ball bearing casters so that when the machine is jacked up, it can be turned around on the casters in any direction or in any desired position.

Figure 1:
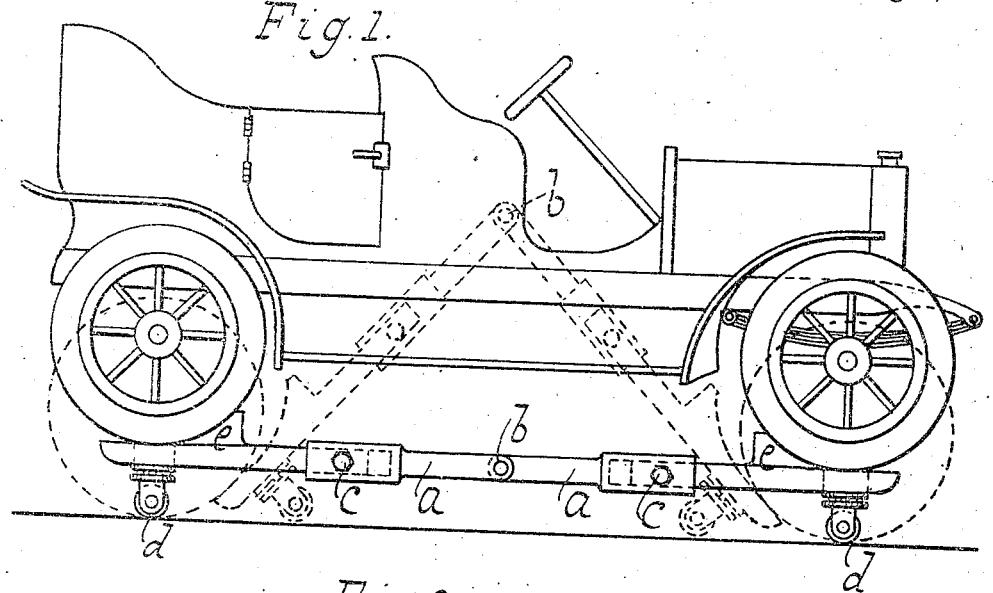
Figure 2:
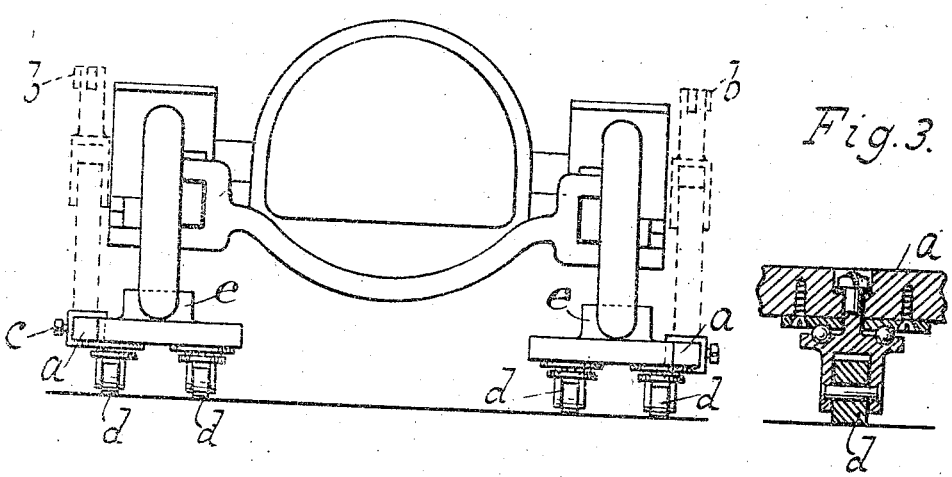
Figure 3:
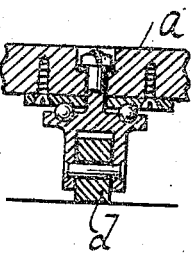
Figure 4:
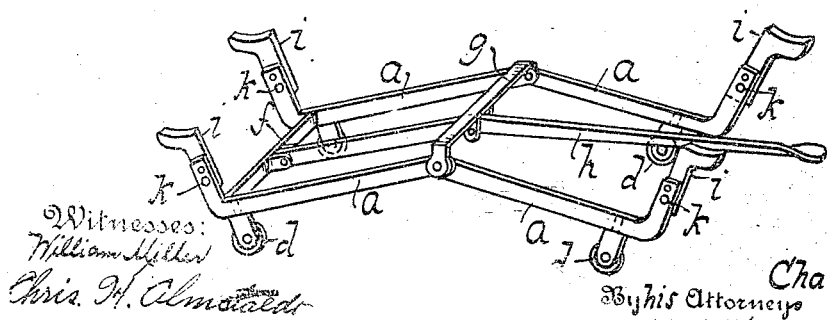

In the accompanying drawings Figure 1 is a side elevation of my device applied to an automobile. Fig. 2 is a front view of an automobile with my device under it. Fig. 3 is a detailed sectional view of one of the casters. Fig. 4 is another form or modification of my device.

The device consists essentially of a jointed lever $a$ shown in Fig. 1. This lever is made of two bars and is jointed or hinged at $b$, to form toggle levers. The lever may be made adjustable by means of pins, etc., as shown at $c$ so as to accommodate it for use on vehicles of different sizes. At each end of the lever $a$ is a swivel or ball bearing caster $d$, shown in detail in Fig. 3. A short distance from each end of the lever $a$ is a lug or projecting stop $e$. There are of course, two levers $a$, exactly like that shown in Fig. 1, one lever being used for each side of the machine.

The operation of the device is as follows: The lever is placed between the front and rear wheels of a machine, as shown in the dotted line in Fig. 1, and is then pressed down by hand pressure, or by a man standing on the same until the lever is straightened out into the position shown in full lines in Fig. 1. As the lever $a$ is pressed down and straightened out, the ends with the caster $d$ slip under the wheels of the automobile and raise it from the ground. Of course, only one side is raised at a time, in the construction shown, and then the user goes to the other side of the machine and presses the corresponding lever down and the machine is raised as shown in Fig. 2.

As shown in Fig. 2, the toggle lever $a$ is provided with a transverse strip of suitable construction on which the front and rear wheels of the vehicle are adapted to rest. These transverse strips are located near each end portion of a toggle lever and each strip has swivelingly connected to its lower portion one or more casters or rollers $d$. The lugs $e$ as shown form a portion of the transverse strips and serve to prevent the vehicle when in position on the lever from rolling in either direction.

In the modification shown in Fig. 4, the levers $a$ are joined by cross bars $f$ and $g$ and a lever $h$ is fulcrumed to the end cross bar $f$ and pivoted to the center cross bar $g$, in this construction, the levers $a$ have uprights $i$ which are adjustable at $k$ for machines of varying heights. When using the device as constructed in the manner shown in Fig. 4, the uprights $i$ are placed under the axle of the wheels of the vehicle to be raised and the lever $h$ is pressed down until the levers $a$ attain a straight position, thus lifting the machine from the floor.

I do not wish to be confined to the precise construction shown in the drawings and the specification. For instance, if desired the two levers $a$ may be fastened together by one or more cross bars so that in the construction shown in Fig. 1, when one side is pressed down the other side will also go down, and both sides of the machine be raised from the floor at once.

I claim—

1. A combination turn table and jack, comprising a toggle lever having rotative rollers located at the lower portion of and near the ends of the lever, swivel connections between the lever and the rollers, the ends of said lever being adapted to engage the wheels of a vehicle and when the lever is operated to lift the vehicle, while the swivel connections allow the device to turn in a circular path.

2. A combination turn table and jack, comprising a jointed lever having rotative rollers arranged at the lower portion of and near the ends of the lever, swivel connections between the lever and the rollers, said lever having a pair of lugs each lug being situated near the end of and on the lever to constitute stops for engagement with the front and rear wheels of a vehicle, said rollers being adapted to rotate and swivel when the device is in operation.

3. A combination turn table and jack comprising a jointed lever having rotative rollers arranged at the lower portion of and near the ends of the lever, swivel connections between the lever and the rollers, and devices for adjusting the levers to fit different lengths of vehicles, said rollers being adapted to rotate and swivel when the device is in operation.

In testimony whereof I have hereunto set my hand in the presence of two subscribing witnesses.

CHARLES F. SAUTTER.

Witnesses:
   Wm. E. Warland,
   Chas. H. Almstaedt.